United States Patent [19]
Takada, deceased et al.

[11] 3,929,205
[45] Dec. 30, 1975

[54] THREE POINT SAFETY BELT SYSTEM WITH INERTIA ACTUATED INFLATABLE BELTS

[75] Inventors: Takezo Takada, deceased, late of Hikone, Japan; by Juichiro Takada, heir, Tokyo, Japan

[73] Assignee: Takata Kojyo Co., Ltd., Tokyo, Japan

[22] Filed: Jan. 9, 1974

[21] Appl. No.: 432,124

[30] Foreign Application Priority Data
Jan. 12, 1973 Japan................................. 48-5928

[52] U.S. Cl............ 180/82 C; 280/150 SB; 297/388
[51] Int. Cl.².......................................... B60R 21/08
[58] Field of Search ............ 280/150 SB; 180/82 C; 297/388, 389, 387

[56] References Cited
UNITED STATES PATENTS

| | | | |
|---|---|---|---|
| 3,190,694 | 6/1965 | Isaac..................................... | 297/388 |
| 3,348,881 | 10/1967 | Weman........................ | 280/150 SB |
| 3,391,961 | 7/1968 | Gardner et al............... | 280/150 SB |
| 3,414,326 | 12/1968 | Raffaelli...................... | 280/150 SB |
| 3,606,456 | 9/1971 | Cazabon....................... | 280/150 SB |
| 3,613,819 | 10/1971 | Maloney ......................... | 180/82 C |
| 3,653,714 | 4/1972 | Gentile........................ | 280/150 SB |
| 3,685,606 | 8/1972 | Blow.................................. | 180/114 |
| 3,700,281 | 10/1972 | Servadio....................... | 280/150 SB |
| 3,781,061 | 12/1973 | Walz................................ | 180/82 C |
| 3,794,135 | 2/1974 | Ewert................................ | 180/82 C |

Primary Examiner—Philip Goodman
Assistant Examiner—John P. Silverstrim
Attorney, Agent, or Firm—Wolder & Gross

[57] ABSTRACT

An automatically applied three point safety belt system includes a retractor reel located at one side of the vehicle seat and spring rewinding an inflatable tubular lap belt which is arcuate in its inflated state and a retractor reel located at the same side of the seat back above the occupant shoulder level and spring rewinding a shoulder belt having a rear inflatable tubular section which upon inflation, extends horizontally, forwardly of the occupant's shoulder. The ends of the belts are joined proximate an attached coupling ring which is lockable in engagement with a coupling hook on the other side of the seat. A flexible tube connects the interiors of the belts by way of a three way valve to a compressor, the valve being opened to connect the belt interiors to the compressor when the seat is occupied, and the vehicle door closed to inflate and extend the belts to advance the ring into engagement with the hook, and a manually, releasable locking member is actuated in response to such engagement, and the belts are deflated. A control network, including an inertia switch inflates the belts and locks the retractor reels under abnormal riding conditions, and recycles the application sequence when the ring is not engaged by the hook member.

5 Claims, 13 Drawing Figures

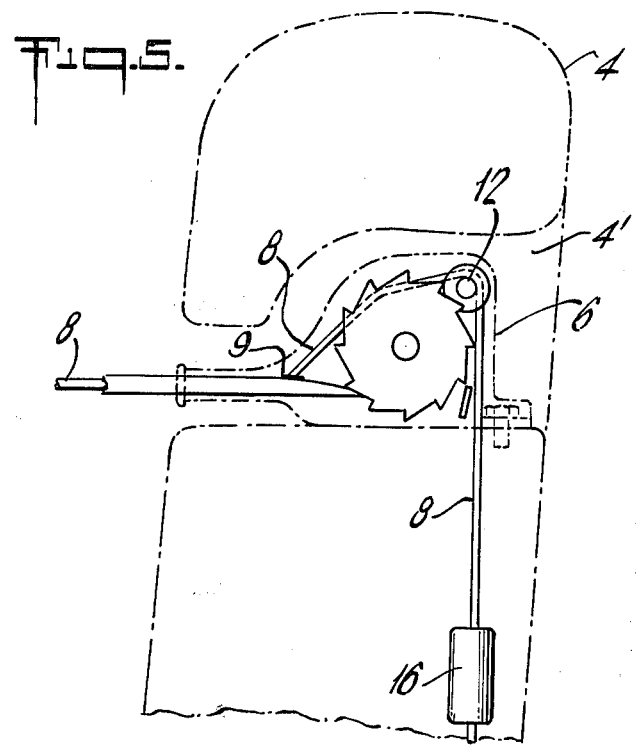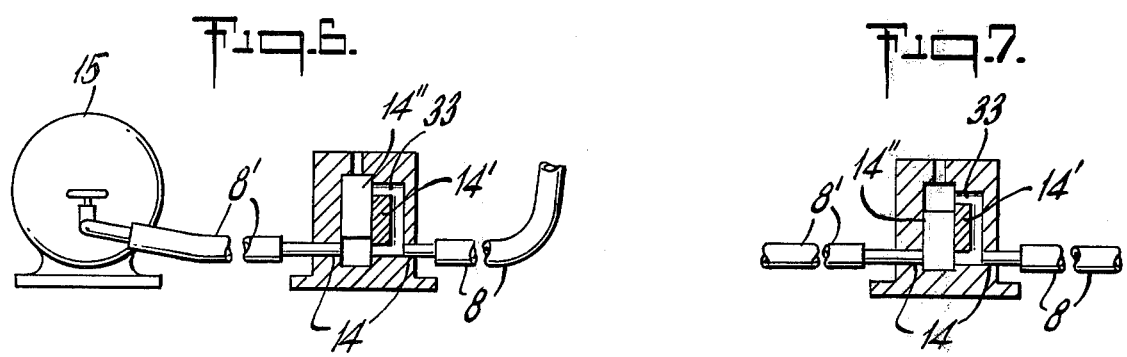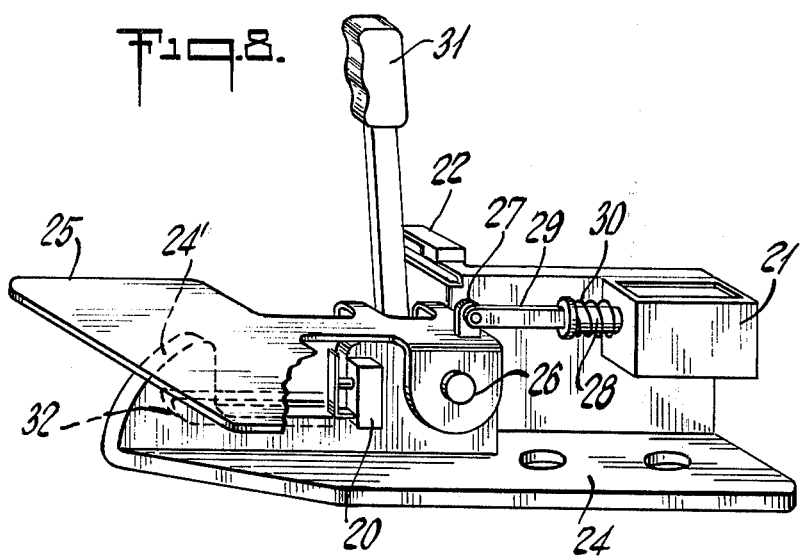

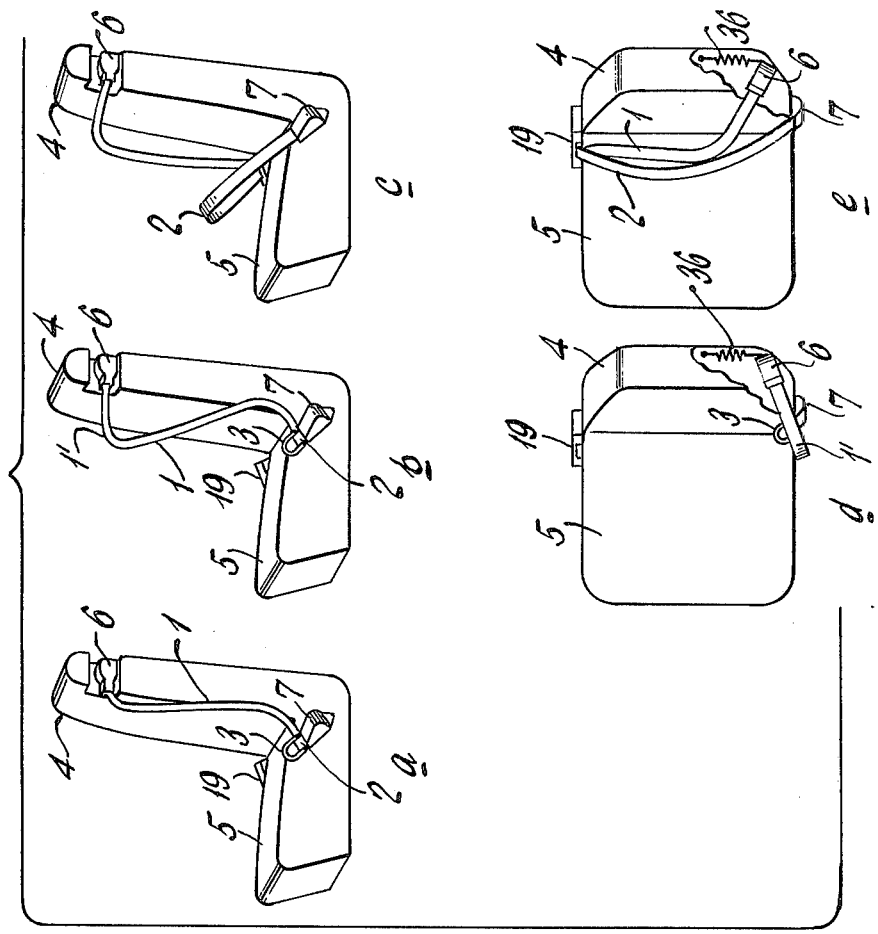
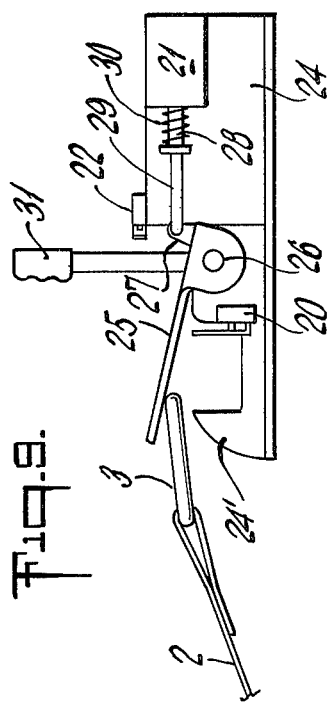
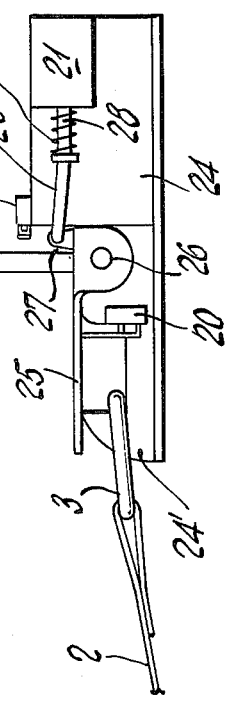
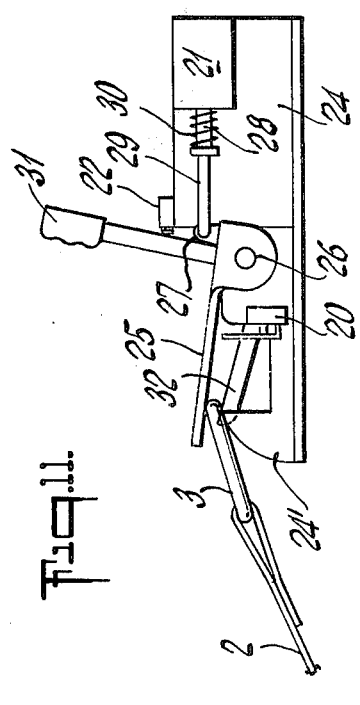

THREE POINT SAFETY BELT SYSTEM WITH INERTIA ACTUATED INFLATABLE BELTS

BACKGROUND OF THE INVENTION

The present invention relates generally to improvements in vehicle seat occupant safety restraint systems, and it relates more particularly to an improved three point safety belt system of the lap and shoulder belt inflatable type, in which the belts are automatically applied to the seat occupant.

In order to minimize or prevent injury to the passenger or driver of an automobile or other vehicle, it is a general practice to provide each seat with a safety belt system, commonly of the three point type, that is an arrangement in which the ends of the shoulder and lap belts are joined at or near a common buckling member. It is also known to provide the individual shoulder and lap belts with respective spring rewinding retractor reels which may be selectively locked or against belt withdrawal or which are automatically locked upon the occurrence of an abnormal vehicle condition, such as a collision, excessive inclination or rapid acceleration, or stopping, as may be detected by an inertia type sensing device, and to inflate the belts upon such occurrence. However, the above systems heretofore available possess an important disadvantage, in that they fail to function if they are not properly applied to the seat occupant. Many arrangements have been proposed to assure the application of the safety belts to the seat occupants, such as by providing a warning signal when the belt of an occupied seat is not buckled, or by preventing the starting up of the vehicle engine in such circumstances. These arrangements, however, are easily circumvented and are accordingly unsatisfactory. Systems have been proposed for automatically applying the seat belt to the seat occupant, but these have been highly complicated and expensive mechanisms which are unreliable, highly space consuming, of little versatility and otherwise leaving much to be desired.

SUMMARY OF THE INVENTION

It is a principal object of the present invention to provide an improved vehicle safety belt system.

Another object of the present invention is to provide an improved mechanism for applying a safety belt to a vehicle seat occupant.

Still another object of the present invention is to provide an improved mechanism for applying a lap and shoulder belt to a seat occupant automatically upon the occupation of the seat and the closure of the vehicle door, and in the absence of any choice on the part of the seat occupant.

A further object of the present invention is to provide a system of the above nature characterized by its reliability, ruggedness, compactness and great versatility and adaptability.

The above and other objects of the present invention will become apparent from a reading of the following description taken in conjunction with the accompanying drawings which illustrate a preferred embodiment thereof.

In a sense, the present invention contemplates the provision in a vehicle having a seat, including a seat portion and a back rest, comprising a first spring loaded retractor positioned proximate a first side of the seat portion, and a second spring loaded retractor and a belt outlet position on the same side of the back rest above the shoulder level of a seat occupant, a lap belt extendable from the first retractor and having a first coupling member at its outer end, a second coupling member position at the other side of the seat portion and releasably engageable with the first coupling member, a shoulder belt extendable from the second retractor and joined to the lap belt near the end thereof, and applicator means for withdrawing and advancing the lap belt along a forwardly convex curved path about the seat occupant, to bring the coupling members into engagement and for advancing the shoulder belt from the second retractor along a path extending horizontally and forwardly from the outlet at a level above the seat occupant's shoulder for a distance forward of the shoulder.

In its preferred form, the lap belt and the inner portion of the shoulder belt are tubular and inflatable and the applicator means includes a flexible tube communicating with the tubular belt section and connected through a valve to a compressor. The first coupling member is a ring and the second coupling member is a hook and includes a swingable guide plate leading into the hook and swung to a hook closing position in response to the ring engaging the hook. The valve is solenoid actuated to effect the inflation of the belts when the seat is occupied and the vehicle door is closed, and the deflation of the belts upon locking of the ring to the hook. The belts are again inflated and the retractors locked against belt withdrawal upon the sensing of an abnormal vehicle condition by an inertia switch. A delay network is provided to provide the recycling of the belt applying sequence when the advanced belt does not effect the engagement of the coupling members.

The improved safety belt system is highly reliable, rugged, compact, simple and convenient to install and of great versatility and adaptability.

BRIEF DESCRIPTION OF THE DRAWINGS

FIG. 5 is a side elevational view of the shoulder belt retractor unit mounted in the seat back rest and the air injection tube;

FIG. 6 is a side elevational and sectional view of the air compressor unit and control valve illustrated in an actuated state;

FIG. 7 is a view of the valve similar to FIG. 6 with the valve shown in a deactuated state;

FIG. 8 is a perspective view of the belt coupling or seizure mechanism;

FIG. 9 is a side elevational view of the seizure mechanism with the guide member shown raised by the energized solenoid attenddent to the insertion of the coupling ring;

FIG. 10 is a view similar to FIG. 9 with the mechanism shown in a coupling ring engaged condition;

FIG. 11 is a view similar to FIG. 9 illustrating the manual activated position of the mechanism to release the coupling ring;

FIGS. 12(a) to 12(e) are side perspective and top plan views of a seat provided with the improved mechanism illustrated in sequential belt application positions.

DESCRIPTION OF THE PREFERRED EMBODIMENT

Figure 1:
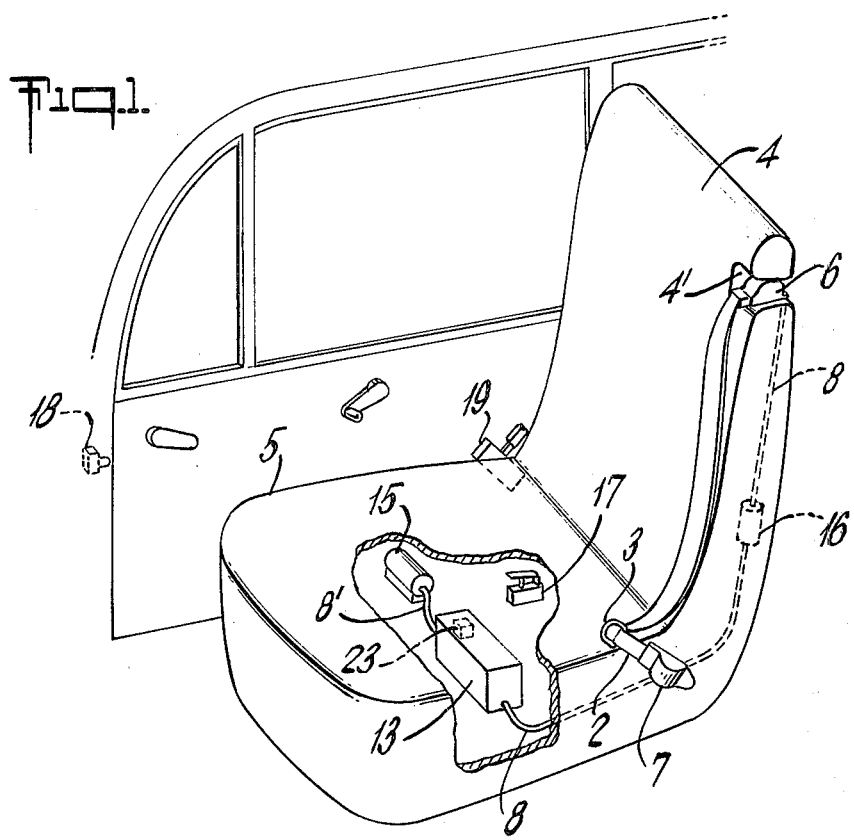
FIG. 1 is a partially fragmented side perspective view of the present improved mechanism illustrated as applied to an automobile seat.

Referring now to the drawings which illustrate a preferred embodiment of the present invention, as best seen in FIGS. 1 to 4, a tubular web extends through a ring shaped hook 3 and is folded intermediate its ends and stitched proximate the hook 3 to form a closed loop engaging and secured to the hook 3 and dividing the web to provide a shoulder belt 1 and a lap belt 2. The end section of the shoulder belt 1 is wound on the spring loaded retractor or rewind reel of a solenoid operated emergency locking and winding unit 6 of conventional construction mounted for free transverse movement within a recess 4' provided in the seat back 4 at a position slightly above the normal passenger's shoulder occupying the seat is resiliently held in the predetermined horizontal orientation by means of a helical tension spring 36 shown in FIG. 12(d) and (e).

Figure 2:
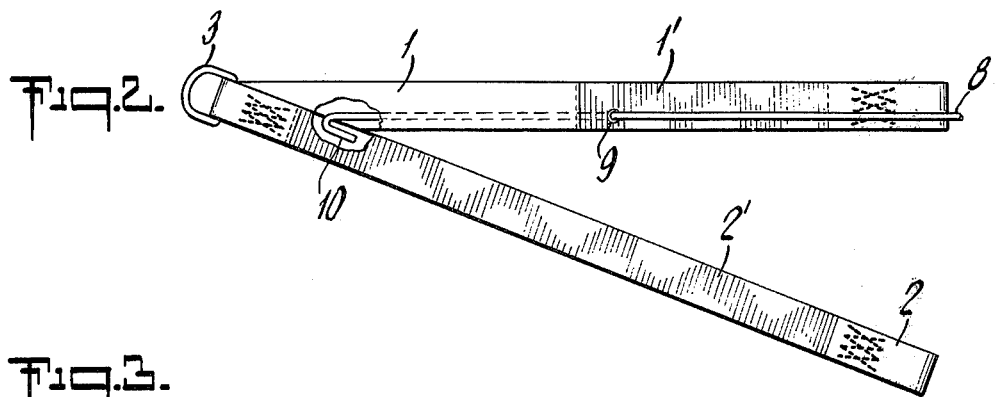
FIG. 2 is plan view of the shoulder and lap belt, per se.
Figure 3:
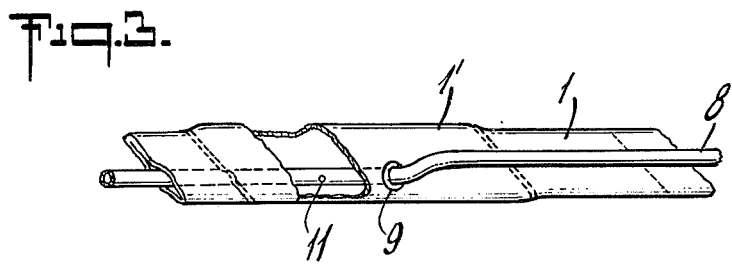
FIG. 3 is a fragmentary perspective view of a portion of the shoulder belt and the associated air injection tube.
Figure 4:
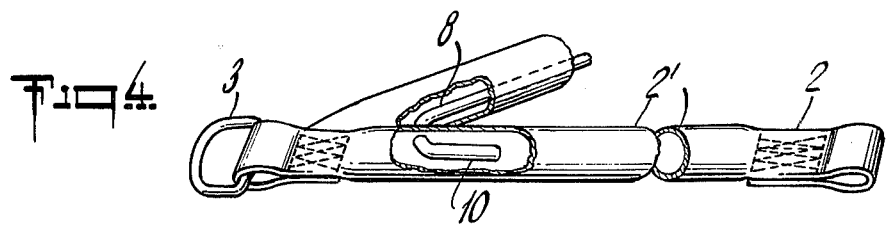
FIG. 4 is a fragmentary perspective view of the lap and shoulder belts and their junction area and the air injection tube.

The end part of lap belt 2 is wound on the retractor reel of another solenoid operated emergency locking and winding unit 7 of conventional construction, that is mounted on the lateral side part of the seat cushion 5. A minor portion 1' of the shoulder belt 1 and a major portion 2' of the lap belt 2, shown by the shaded areas in FIG. 2, are made of a synthetic polymeric or like material, and bonded or tightly stitched together at their opposite ends whereby said portion is formed into air-tight inflatable pouch sections sealed against air leakage when charged with the compressed air. A tube 8 of small diameter made of a soft synthetic polymeric resin material enters into the shoulder belt 1 through and is hermetically sealed to a hole 9 provided in the pouch section 1' and is opened at one end 10 which is located in the inside of the pouch section 2' of the lap belt 2 and enters therein through the connecting portion of the shoulder belt 1 with the lap belt 2. The tube 8 has a small opening 11 which is disposed inside the pouch section 1' of the shoulder belt 1. As shown in FIGS. 1, 5 and 6, the other end of the tube 8 extends through the inside of the seat back 4 by way of a grooved guide roller 12 mounted on the emergency locking and winding unit 6 and is connected to the outlet port of a solenoid actuated three way valve 14 provided in a control unit 13 mounted in the lower part of the seat cushion 5. Another tube 8' connects the inlet port of the valve 14 and to a compressor 15. The valve 14 has a solenoid 14' and a valve 14'' and operates in the known manner so that, when the solenoid 14' is energized or actuated the valve 14'' operates so as to establish an air communication between the tubes 8 and 8' and close the valve exhaust port 33 and, when the solenoid 14' is deenergized, the air communication between the tubes 8 and 8' is interrupted and the exhaust port 33 is simultaneously opened. The tube 8 extending through the seat back 4 has a redundant length intermediate the emergency locking and winding unit 6 and the control unit 13 and carries a weight 16 so that the tube may be raised and lowered as the shoulder belt 1 is extended and retracted. The control unit 13 is electrically connected with an occupant sensing seat switch 17 positioned inside the seat cushion 5, a door closure sensing switch 18, a seizure or coupling detector switch 20 which is secured to a seizure or coupling unit 19 shown in FIG. 8 which is mounted in turn to the side part of the seat cushion 5, a hook guide lever actuated solenoid 21 and a lock releasing lever sensing switch 22 and is provided with an enclosed sensor unit 23, such as an inertia switch that is actuated upon the occurrence of some abnormal situation of the vehicle. An automatically operating air compressor 15 is provided with a pressure regulating switch and is connected therethrough directly to the power source. The lap belt 2 is constructed with the inside of the belt which fits the passenger's body and the outside thereof are made of fibrous or filamentory materials of different overall lengths, thicknesses and properties so that the belt describes, when inflated and extended, a predetermined definite trajectory of a semi-circular shape.

Figure 13:
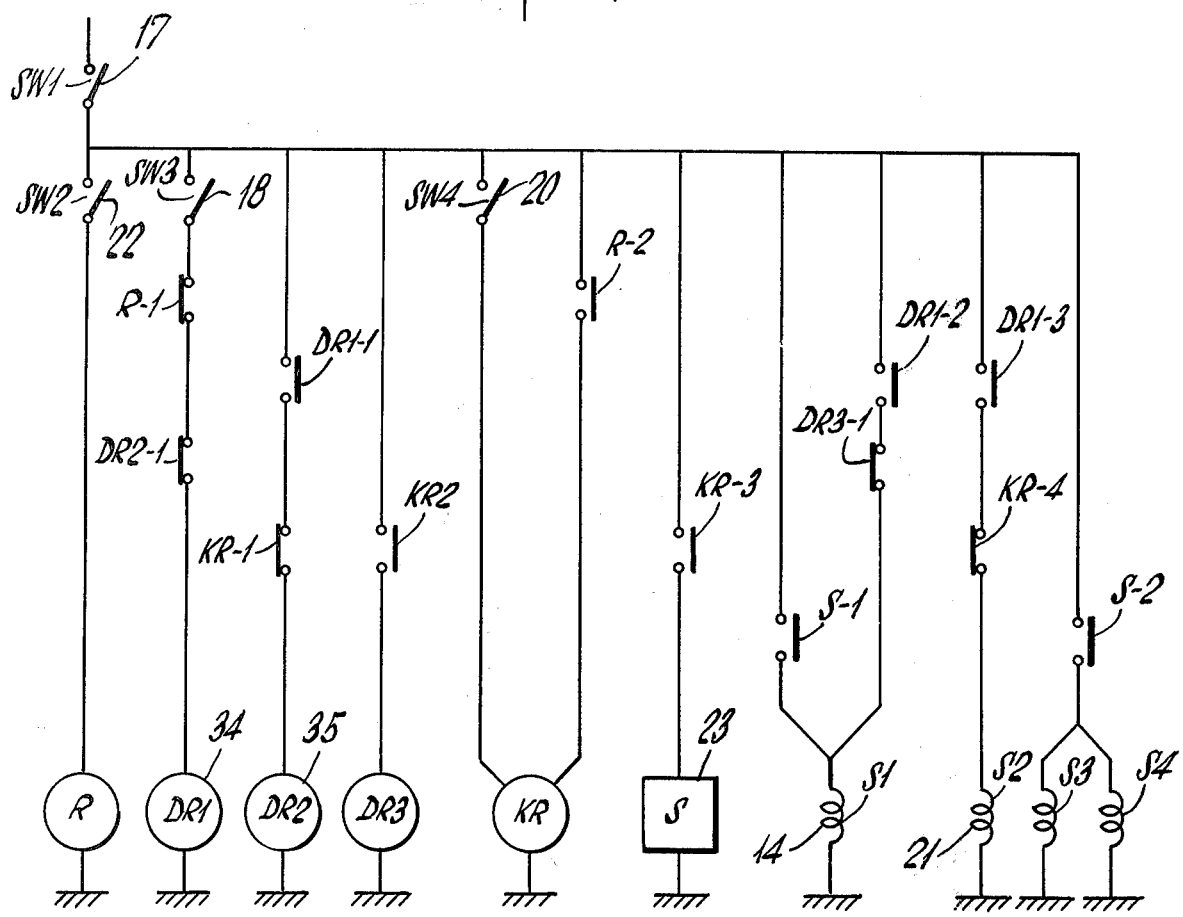
FIG. 13 is a schematic diagram of the mechanism control network shown by way of example.

The seizure unit 19, which functions to engage the hook ring 3 provided on the junction of the shoulder belt 1 and the lap belt 2, is mounted, as shown in FIG. 1, to the side portion of seat cushion 5 and, as shown in FIG. 8, is provided with a hook hanger or coupler 24 for engaging the hook 3 and a hook guide lever 25 pivotally mounted on the hook hanger 24 by a pin 26 and adapted to guide the hook 3. A solenoid unit 21 provided with an armature plunger 28 and a coil spring 30 is mounted, as with screws, to the hook hanger 24. The plunger 28 is connected to an eccentric ear 27 on the hook guide lever 25 by means of a connecting rod 29, in a manner that the forward flat portion of the hook guide lever 25 and hook portion 24' of the hook hanger 24 contact each other and are normally kept in a closed position under the influence of the coil spring 30 which forwardly urges plunger 30. To said pin 26 is rockably mounted a release lever 32 formed as an integral unit with a release handle 31 and being adapted for releasing the engagement between the hook 3 and the hook hanger 24. Mounted on the hook hanger 24, is the lever sensing switch 22 that is actuated upon manipulation of the release handle 31 and the hook detecting switch 20 for confirming the engagement between the hook 3 and the hook hanger 24. The above components of the seizure unit are suitably protected by a cover member. The sensor unit 23 is housed in the control unit 13, and is defined by, for example, an inertia switch of the known pendulum or a steel ball type. The inertia switch is connected to the solenoid valve 14 and the emergency locking and winding units 6, 7, and can sense the occurrence of an emergency stop, a sharp impulse, steep inclination and other abnormal situations of the automotive vehicle. An example of the control circuit is illustrated in FIG. 13.

The air-belt type passive constraint protective device so far described operates as follows: When the vehicle passenger occupies his seat and closes the door, the solenoid valve 14 is actuated by closure of the seat switch 17 and the door switch 18 and the compressed air from air compressor 15 is supplied through the tubes 8, 8' into the pouch section 1' of shoulder belt 1 through small hole 11, thus causing the pouch section to be expanded. Thus, the pouch section 1' of the shoulder belt is expanded from the state shown in FIG. 12(a) to that shown in FIGS. 12(b) and (d) and extracted from the locking and winding unit 6. At this time, the shoulder belt 1 is guided and extended forwardly and obliquely towards the outside of the seat, under the effect of coil spring 36 attached to the unit 6 without touching the passenger's shoulder. When the pouch section 1' of shoulder belt 1 is fully charged with air, the air is injected under pressure into the pouch section 2' of the lap belt 2, through the opening in the tube 8, so that the lap belt 2 is extended towards the seizure unit 19 from the unit 7, describing a semi-circle, as shown in FIGS. 12(c) and (e). At this time, the shoulder belt 1 is pulled by the lap belt 2 against the force of the coil spring 36 and deviated towards the one side of the seat so as to traverse a path over the passenger's shoulder until the foremost part of shoulder belt 1 (the portion of the belt adjacent to the hook 3) is engaged by the seizure unit 19 without effecting any physical contact with the passenger's body.

In the operation of the seizure unit 19, the hook guide lever actuating solenoid 21 is closed simultaneously with the closure of the door switch 18 so as to facilitate the seizure of the hook 3 by the seizure unit. The hook guide lever 25 is pulled by the energized solenoid 21 out of engagement with the foremost part 24' of hook hanger 24, as shown in FIG. 9, thus causing the end hook 3 of the safety belt to be seized by the seizure unit. When the hook 3 bears on and actuates the hook switch 20, the solenoid valve 14 is actuated by way of the control unit 13 so as to interrupt the air injection from the air compressor 15 into the tube 8 as shown in FIG. 7. Simultaneously, the air contained in the pouch sections 1' and 2' is discharged through the air exhaust port or vent 33 of the valve 14 and the hook guide lever actuating solenoid 21 is deenergized so that the hook guide lever 25 is spring urged into engagement with the foremost part 24' of the hook hanger 24, in a manner that the hook 3 may not be accidentally disengaged due to vibration or other causes. Thus, the shoulder belt 1 and the lap belt 2 are applied and mounted in position on the seat occupant's body. The circuits of the sensor unit 23 and the control unit 13 are also closed simultaneously and ready for sensing emergency stop, collision, unusual inclination and other abnormal situations of the vehicle. In case of a fall or collision during driving, the sensing unit 23 senses such abnormal situations and locks the emergency locking and winding units 6 and 7 so that the extraction of the safety belts 1, 2 may be positively prevented and the occupant is restrained to his seat. The solenoid valve 14 is again actuated by operation of the control unit 13 so that the compressed air from compressor 15 is injected through the tubes 8', 8 into the pouch sections 1' and 2'', the safety belts being thus inflated to absorb the shock that might otherwise be exerted on the passenger.

When the occupant is seated during the safety belt mounting operation in other than the normal seating position and the hook 3 on the belt end is not completely engaged with the hook guide 24 due to interference therewith by the passenger or from some other cause, the valve 14 is controlled by the operation of the timers 34, 35 included in the control unit 13 to effect the discharge of the air contained in the pouch sections 2' and 1' which are then retracted into the units 7 and 6. The overall device is thus returned in to its starting position. The application operation of the safety belts may now be started again. The safety belt thus applied to the passenger can be freed in the manner shown in FIG. 11. By actuating the manually operable handle 31 provided in the seizure means 19, the release lever 32 lifts the hook 3 out of engagement with the hook hanger 24, and the shoulder lap belts 1, 2 are retracted to their starting positions by return spring means provided in the locking and winding units 8, 9, the tube 8 which was extended with the shoulder belt 1 is also retracted into the seat back 4 simultaneously with shoulder belt 1 under the effect of the weight 16 and the device is restored to its starting position.

With the mechanism of the present invention, the safety belt is automatically applied to the vehicle passenger without any choice on his part, and thus the frequency of accidents of collision of automotive vehicles leading to casualties may be considerably reduced. Moreover, according to this invention, the air-belt type passive restraint protecting system is applied to the vehicle passenger speedily and reliably because of the improved actuating mechanism.

While there has been described and illustrated a preferred embodiment of the present invention, it is apparent that numerous alterations, omissions and additions may be made without departing from the spirit thereof.

It is claimed:

1. A safety belt system in a vehicle having a seat including a seat portion and a back rest comprising a first spring loaded retractor positioned proximate a first side of said seat portion, a second spring loaded retractor and a belt outlet positioned on said back rest at the same side as said first retractor with said belt outlet at the upper part of said back rest at least at the level of the shoulder of an occupant of said seat, an inflatable tubular lap belt extendable from and retractable by said first retractor, and of curved configuration in an inflated condition with its concave face confronting said back rest, a first coupling member conntected to the outer end section of said lap belt, a second coupling member positioned proximate the second side of said seat portion opposite said first side and releasably engageable with said first coupling member, a shoulder belt extendable from and retractable by said second retractor through said belt outlet and connected at its outer end section to said lap belt outer end section and applicator means for withdrawing and advancing said lap belt in a curved path from said retractor toward said seat portion second side to bring said first coupling member into registry with said second coupling member and for withdrawing and advancing said shoulder belt from said second retractor along a predetermined path extending forwardly from said outlet at above said shoulder level for a distance forward of said shoulder, said applicator means comprising a source of compressed air and means including a flexible tube providing communication between said compressed air source and the interior of said lap belt.

2. The system of claim 1 wherein said shoulder belt includes an inner inflatable tubular section and said flexible tube provides communication between said compressed air source and the interior of said shoulder belt tubular section.

3. The system of claim 1 including means responsive to engagement between said first and second coupling members for releasably locking said engaged coupling members.

4. The system of claim 3 including hand operated means for releasing said first coupling member from said second coupling member.

5. The system of claim 4 wherein said first coupling member comprises a first hook, said second coupling member comprises a second hook member and said locking means comprises a guide plate pivoted to said second hook member and swingable between an open position defining with said second hook member an open throat leading into said second hook member and a lock position closing said second hook member.

* * * * *